US005798576A

United States Patent [19]

Ostermann et al.

[11] Patent Number: 5,798,576

[45] **Date of Patent: *Aug. 25, 1998**

[54] METHOD FOR RESETTING A CENTRAL LOCK SYSTEM OF A MOTOR VEHICLE WITH A REMOTE ACTUATING DEVICE

[75] Inventors: Wilfried Ostermann, Essen; Fred Welskopf, Herne, both of Germany

[73] Assignee: Kiekert AG, Heiligenhaus, Germany

[ * ] Notice: The term of this patent shall not extend beyond the expiration date of Pat. No. 5,712,512.

[21] Appl. No.: 694,908

[22] Filed: Aug. 9, 1996

[30] Foreign Application Priority Data

Sep. 8, 1995 [DE] Germany ........................ 195 33 197.4

[51] Int. Cl.$^{6}$ ........................ G06F 17/00

[52] U.S. Cl. ........................ 307/10.3; 307/10.2; 307/10.4; 364/424.037; 364/424.04; 180/287; 340/825.69

[58] Field of Search ........................ 307/9.1–10.8; 361/171; 340/425.5, 426, 534, 825.31, 825.34, 825.69, 82, 72; 180/287; 123/198 B, 198 DB, 198 DC; 364/423.098, 423.099, 424.034, 424.037, 424.038, 424.04, 424.045, 424.059

[56] References Cited

U.S. PATENT DOCUMENTS

| | | | |
|---|---|---|---|
| 4,942,393 | 7/1990 | Waraksa et al. | 340/825.72 |
| 5,049,867 | 9/1991 | Stouffer | 307/10.2 |
| 5,513,107 | 4/1996 | Gormley | 307/10.2 |
| 5,523,948 | 6/1996 | Adrain | 364/431.01 |
| 5,561,420 | 10/1996 | Kleefeldt et al. | 340/825.31 |
| 5,583,383 | 12/1996 | Denz | 307/10.2 |

FOREIGN PATENT DOCUMENTS

| | | |
|---|---|---|
| 42 27 87 | 1/1994 | Germany . |
| 42 38 858 | 2/1994 | Germany . |
| 44 28 947 | 4/1996 | Germany . |

*Primary Examiner*—William M. Shoop, Jr.
*Assistant Examiner*—Peter Ganjian
*Attorney, Agent, or Firm*—Herbert Dubno

[57] ABSTRACT

A central-locking system is reset upon loss of a portable remote-control unit and replacement by another in a system in which a diagnostic device is temporarily connected and switched to the stationary part of the locking system into a "SETUP" mode. The key is then inserted into a key-operated switch to interrogate the transponder with the transceiver and from the latter the key-identification code word stored in the transponder and the transponder initial code word are transferred. The key-identification code word and transponder initial code word are stored in a code-word memory and the transmitter is then operated to send a remote-control changing code word to the receiver and enables switching back to the "NORMAL" mode of operation and removal of the diagnostic device.

6 Claims, 1 Drawing Sheet

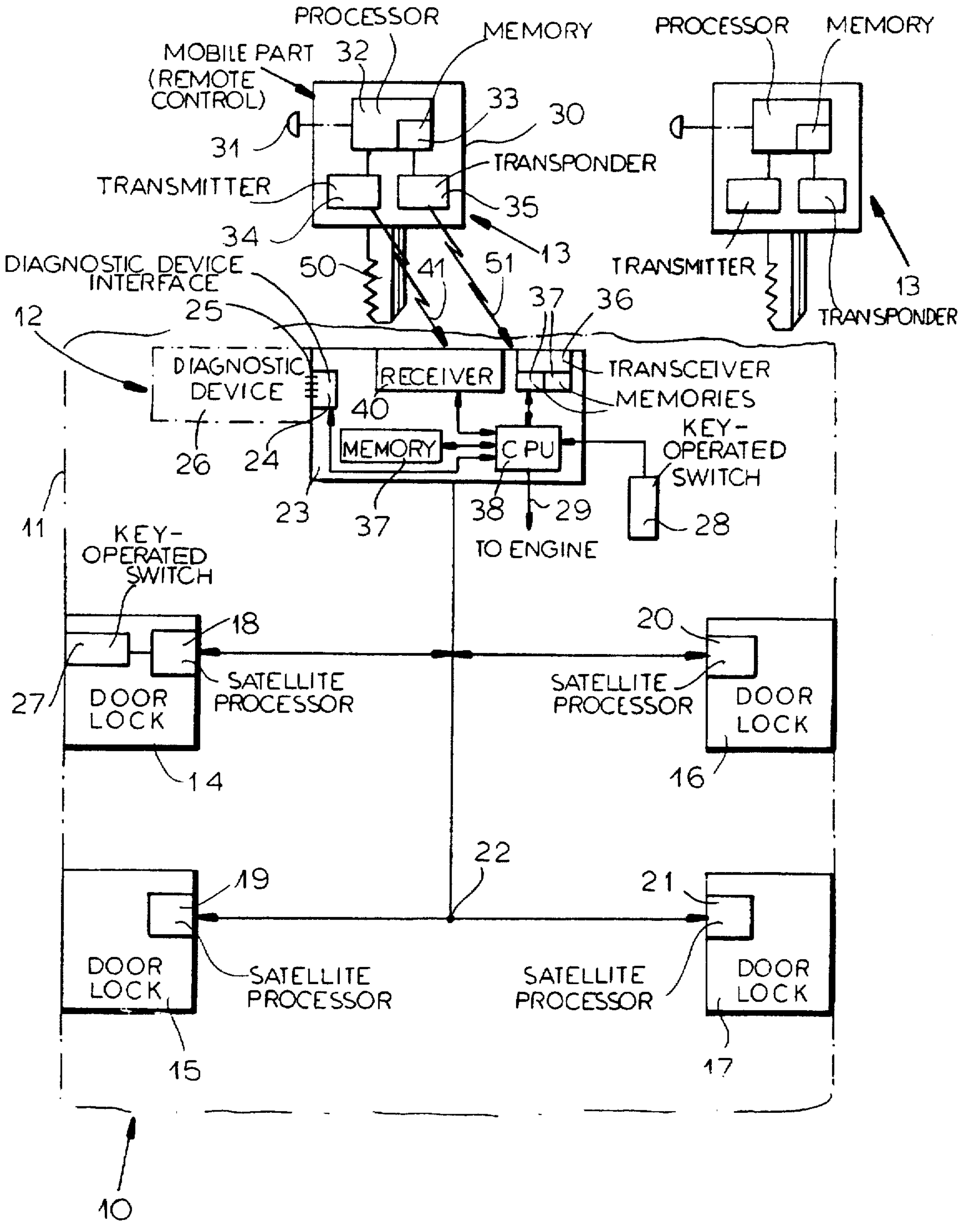
PROCESSOR
MEMORY
MOBILE PART
(REMOTE CONTROL)
32
33
30
31
TRANSPONDER
TRANSMITTER
35
34
13
DIAGNOSTIC DEVICE INTERFACE
50
41
51
25
12
37
36
DIAGNOSTIC DEVICE
RECEIVER
TRANSCEIVER
MEMORIES
40
KEY-OPERATED SWITCH
26
24
MEMORY
CPU
23
37
38
29
28
11
TO ENGINE
KEY-OPERATED SWITCH
18
20
SATELLITE PROCESSOR
27
DOOR LOCK
14
16
22
19
21
15
17
10
PROCESSOR
MEMORY
TRANSMITTER
TRANSPONDER
13

METHOD FOR RESETTING A CENTRAL LOCK SYSTEM OF A MOTOR VEHICLE WITH A REMOTE ACTUATING DEVICE

FIELD OF THE INVENTION

Our present invention relates to a method of resetting a central lock system of a motor vehicle capable of locking and unlocking the door locks, for example, and having a portable part which serves as a remote actuator or operator of the central lock system.

BACKGROUND OF THE INVENTION

A central lock system for a motor vehicle can have a central unit provided with a microprocessor and any requisite memories and connected by, say, a bus to a number of door locks so that these locks can be operated from the central station. A portable unit can be provided for actuating the lock system, i.e. locking and unlocking the door locks.

The portable or mobile unit can have a transmitter, a transponder and a key while the stationary part of the lock system, i.e. the part mounted in the vehicle, can have a receiver, a transponder-querying transceiver and a key-operated switch which is capable of being operated by the key of the portable part. The key switch and the key are thus complementary to one another.

The portable part is usually a compact unit which can be carried on the person of the vehicle operator like a conventional key. The elements of the stationary part of the central lock system can be located at various places on the vehicle. The key switch can be provided with mechanical elements enabling the cylinder of the key switch to also operate mechanical systems like a door lock, or the key switch can be provided without such a mechanism.

The transmitter and receiver operate wirelessly, e.g. via sound waves, for example, ultrasound, or with electromagnetic waves, for example, high-frequency radio waves or infrared light waves. The receiver is mounted in the vehicle and the transponder-querying transceiver can be located close to the key switch or can have an antenna close to the key switch. A plurality of key switches can be provided, each with a respective transponder-querying transceiver. One key switch can, for example, be mounted for operation from the exterior of the vehicle while another key switch can be internally operable, e.g. mounted on the dashboard. The latter key switch can serve also as an ignition switch to set the vehicle in operation like a conventional ignition switch.

A central locking system of this type is described, for example, in DE 44 28 947 C1. This locking system has a transmitter and receiver which synchronously advance, preferably cyclically, through remote actuation changing code words, independently of an actuation of the transmitter. When the transmitted code word is recognized by the receiver, then the lock actuation can be effected. The changing code word system is described also in DE 42 27 887 C1 and 42 38 858 C1.

The remote actuation changing code word can be formed with a fixed code part which is constituted by a key identification code word. Each mobile unit has its own key identification code word different from the key identification code words of the portable units.

The key identification code word is permanently stored in the portable unit on the fabrication thereof. When the transmitter is actuated, the instantaneous remote control-changing code word at that point stored in the mobile or portable unit, is transmitted to the receiver and compared with the instantaneously-effective remote control code word formed in the receiver.

Upon identity of the two compared code words, or upon the deviation between them lying within a certain divergence window, an unlocking or locking of the central lock system can be effected.

To set the vehicle in operation, the key is inserted into the interior key switch whereupon the transponder-querying transceiver interrogates the transponder to draw the transponder code word transmission from the transponder code word memory thereof. This transponder code word is compared with the transceiver code word stored in memory. When this test shows identity, the then-effective remote control changing code word from the receiver is read into the transponder-querying transceiver and is sent to the transponder. Both the transceiver code word memory and the transponder code word memory store this remote actuation code word as the new transponder changing code word.

It will be self understood that identity of the transponder changing code words can also be used as the signal for setting the vehicle in operation.

By means of the key switch accessible from the exterior of the vehicle, a locking or unlocking can correspondingly be carried out in the case of a failure of the transmitter, for example, because of a drained battery. For this purpose, the transponder need not have its own energy source. This system has been found to be highly advantageous in practically all aspects. However, with respect to the danger of theft, there is a problem in that a vehicle operator can lose the portable unit or one of a number of portable units so that the finder can then have unauthorized entry into the vehicle and even can steal it.

OBJECTS OF THE INVENTION

It is the principal object of the present invention to provide an improved method of operating a central-lock system with improved security against theft and without drawbacks of earlier central-lock systems.

Another object of the invention is to provide an improved method of resetting a central-lock system, e.g. upon loss of a portable remote-control unit, so as to make that system less prone to access by someone who may have found or stolen a portable remote actuating unit.

Still another object of the invention is to provide an improved method of resetting a central-lock system which will facilitate reestablishment of the operability of a central-lock system and antitheft system upon loss of a portable unit.

SUMMARY OF THE INVENTION

These objects and others which will become apparent hereinafter are attained, in by accordance with the invention, in a method of resetting a central-lock system of a motor vehicle of the type having a remote control unit for locking and unlocking the central-lock system and in which the remote actuating unit has in its portable unit, a transmitter, a transponder and key and the stationary part of the system has a receiver, a transponder-querying transceiver and a key switch complementary to the key. Initially, according to the invention, a diagnostic device is connected to the stationary part of the system and initializes the stationary part and switches it into a "SETUP" mode. Then the key is inserted into the key switch and the key switch is operated to cause the transponder-querying transceiver to interrogate the transponder and transfer a key-identification code word fixed in the transponder and a transponder initial code word to be transmitted from the transponder and stored in a key-identification code word memory and in a transceiver code word memory of the transponder-querying transceiver. The transmitter is then actuated and sends a progressively changing remote-actuation changing code word to the transceiver so that it is stored in the receiver. The central-lock system is then switched over to normal operation ("NORMAL" mode) and the diagnostic device is removed.

The resetting is effected at any time if a mobile or portable unit is lost or at any time that an additional mobile or portable unit must be coordinated with the fixed part of the system.

A diagnostic device is a device which is available exclusively at an authorized service station and which can be coupled to the stationary part and is capable, when the stationary part is in its "SETUP" mode for programming the stationary part. The stationary part in the absence of the diagnostic device cannot be switched into the "SETUP" mode.

During the initialization of the stationary part, the contents of the code word memory of the stationary part are canceled. This applies to the remote-actuation changing code word as well as to the transponder changing code word.

After the resetting, the central-lock unit is returned to its normal mode. With the first actuation of the key switch in the normal mode, for example, in conjunction with the starting of the engine, the transponder initial code word is lost and is replaced in the aforementioned manner by a new transponder alternating code word. The transponder initial code word thus serves exclusively for the resetting of the central-lock system. The first operation of a portable unit in connection with the resetting results in the issuance of the transponder initial code word established at fabrication.

It will be understood also that resetting can be repeated. The transponder initial code word, upon a repeated resetting for a no-longer new mobile unit, is replaced by the last effective transponder alternating code word of the portable unit. The transponder initial code word can preferably have the same format as the transponder-changing code word or the remote-control changing code word, for example, a format of, for example hh:mm:ss.

With the resetting, a synchronization between the portable unit and the stationary part is established with respect to the remote-control changing code word and the transponder changing code word. The resistance to theft is significantly increased since the resetting of a portable unit which was not originally supplied with the system has its key-identification code word canceled in the stationary unit so that an unauthorized individual which may have had access to the key-identification code word and/or the transponder initial code word, is incapable of gaining access to the vehicle since recoupling of the found portable unit is permitted only if that unit is treated as a new unit and subjected to a resetting operation.

The process is repeated, without the need for reconnecting and disconnecting the diagnostic device for each mobile or portable unit to be coupled to the stationary part so that for the respective key-identification code words, remote-control changing code words and respective transponder code words are generated. Usually the number of portable units which can be coupled is limited, e.g. to five.

In an especially advantageous embodiment of the invention, the portable unit whose key-identification code word agrees with a key-identification code word stored in the key-identification code word memory does not require a further query from the transponder. The transponder query in that case need only be used for a new mobile unit to be coupled to the stationary part. In that case, of course, where the memory of the stationary part already stores the key-identification code word, it is not necessary to replace it.

For control purposes, it has been found to be advantageous for a given period following resetting, for example, for 72 hours, to have the stationary part, after each operation of the vehicle, display "REPLACEMENT KEY PROGRAM" or an equivalent display.

With the system of the invention, central lock systems can have any number of mobile units. One mobile unit may service a number of vehicles, especially where company cars are involved.

The key switch can differ depending upon the requirements and can have different mechanical units associated therewith or can be free from mechanical units. Upon actuation of the transmitter, an optical and/or acoustic signal can be emitted. This can also be the case for the locking and unlocking operation in the normal mode. The signal can be a lifting or lowering of the interior locking knobs of the door locks.

When the transmitter and receiver operate with infrared radiation, it will be understood that these elements must be in line of sight with one another. Furthermore, the system can require that, before actuation of the transmitter, the key be removed from the key switch.

BRIEF DESCRIPTION OF THE DRAWING

The above and other objects, features, and advantages will become more readily apparent from the following description referring to the accompanying drawing, the sole FIGURE of which is a diagram illustrating a central-lock system according to the invention.

SPECIFIC DESCRIPTION

In the sole FIGURE of the drawing, we have shown a central-lock system 10 associated with an automotive vehicle 11 and comprising a fixed part 12 and at least one mobile part 13. In the illustration, two such mobile parts 13 are provided.

The central-lock system can comprise a plurality of door locks 14, 15, 16, 17 at respective doors of the vehicle, each having a satellite processor 18, 19, 20, 21, connected by a bus 22 to a central control unit 23 having a plug and jack connector 24 cooperating with a coding connector 25 of a diagnostic device 26. A key-operated switch 27 can be provided at one of the door locks and is the externally-accessible switch previously mentioned. The central unit 23 receives an input from the other key-operable switch 28, i.e. the internally-accessible switch which may also serve as an ignition switch, an output from the central unit being provided at 29 of the engine.

Each of the portable units 13 can comprise a housing 30 having at least one button 31 for transmitting signals. The housing contains a processor 32, at least one memory 33 and transmitter 34 for the wireless signals and a transponder 35. The latter can respond to a transponder-querying transceiver 36 in the stationary unit provided with memories 37 and connected to the CPU 38 of the central lock system. Also associated with the central unit is a receiver 40 responsive to the transmitter 34 wirelessly coupled therewith as represented at 41.

When one of the portable units is lost and another portable unit with its own key-identification code is procured or it is desired to reset two or more such portable units or to couple a new portable unit to the stationary unit, initially the diagnostic device 26 is connected to the stationary unit and the stationary unit is initialized by the diagnostic device and switched by a switch thereof to the "SETUP" mode. The key 50 is then inserted into the key-operated switch 28 to actuate the latter, thereby triggering an interrogation signal 51 from the transponder-querying transceiver 36 to the transponder 35. The key-identification code stored in memory 33 as well as the transponder initial code word from the transponder are transferred to a key-identification code word memory and transceiver code word memory of the transceiver 36. These memories can be included among the memories 37.

The transmitter 34 is then actuated and sends a remote-control changing code word is formed in the transmitter and progressively changing therein to the receiver 40.

The central-locking system is then switched over to normal operation and the diagnostic device is removed.

We claim:

1. A method of operating a central lock system of a motor vehicle having a remote-control arrangement of locking and unlocking the central lock system and wherein the remote-control arrangement comprises a mobile part separate from the motor vehicle and a fixed part on the motor vehicle, said mobile part comprising a transmitter, a transponder and a key, said fixed part comprising a receiver, a transponder querying transceiver and a key-operated switch operable by said key, said method comprising the steps of:

(a) independently of a manual actuation of said transmitter, synchronously advancing a remote-control changing code word in said transmitter and a transceiver code word in said transceiver;

(b) for a NORMAL mode of operation, manually actuating said transmitter to transmit a then-effective remote-control changing code word to said receiver and effecting an identity comparison of said then-effective remote-control changing code work as transmitted to said receiver with a then-effective transceiver code word in said transceiver;

(c) selectively effecting a locking or unlocking operation upon said comparison registering correspondence of said then-effective remote-control changing code work as transmitted to said receiver with said then-effective transceiver code word in said transceiver within a given divergence window;

(d) upon occurrence of an event requiring resetting of said system, temporarily connecting a diagnostic device to said fixed part for initializing same and switching said fixed part into a SETUP mode;

(e) with said fixed part in said SETUP mode, inserting said key into said key-operated switch and actuating said key-operated switch, thereby interrogating said transponder with said transponder-querying transceiver, deriving a key-identification code word stored in said transponder as well as a transponder initial code word from said transponder and storing said key-identification code word and said transponder initial code word respectively in a key-identification code word memory and a transceiver code word memory of said transponder querying transceiver;

(f) then operating said transmitter to send a remote-control changing code word advancing in said transmitter to said receiver and picking up the then-effective remote-control changing code word with said receiver; and (g) then switching said fixed part to said NORMAL mode of operation and removing said diagnostic device.

2. The method defined in claim 1 wherein said central lock system has a plurality of said mobile parts with different key-identification code words, steps (d) through (f) being carried out with said fixed part in said SETUP mode for each of said mobile parts.

3. The method defined in claim 2 wherein the maximum number of said mobile parts for said central lock system is five.

4. The method defined in claim 2 wherein, for mobile parts having key-identification code words corresponding to key-identification code words stored in memory in said fixed part, there is no further query to the fixed part by the transceiver.

5. The method defined in claim 1 wherein, after a resetting of the central lock system, for a predetermined period a display of said fixed part displays an indication of "substitute key" programming thereof after each operation of the motor vehicle.

6. The method defined in claim 5 wherein said predetermined period is 72 hours.

* * * * *